No. 852,365. PATENTED APR. 30, 1907.
J. T. WILLIS.
PIPE COUPLING.
APPLICATION FILED JAN. 3, 1906.
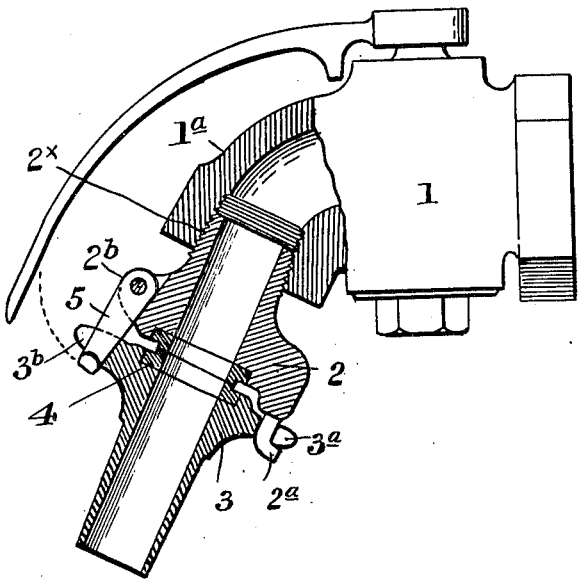
Fig. 1.
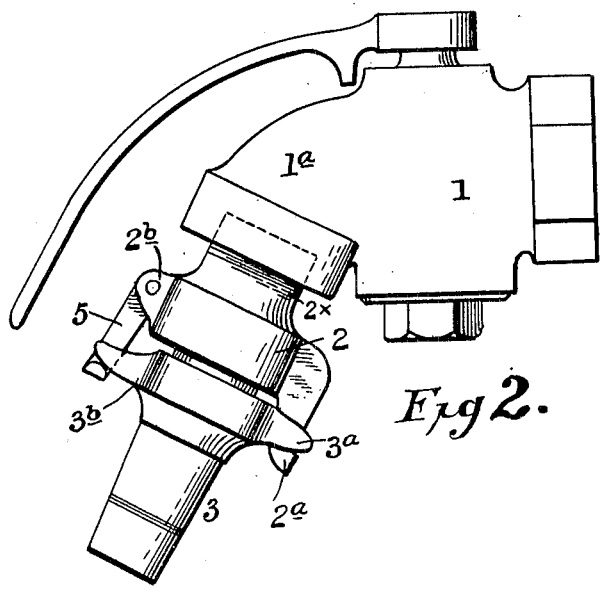 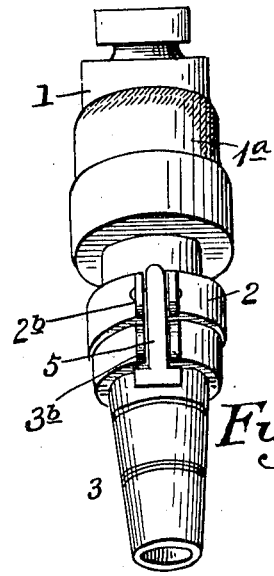
Fig. 2. Fig. 3.
Inventor:
Jacob T. Willis,
Witnesses:

UNITED STATES PATENT OFFICE.

JACOB TAMAS WILLIS, OF MACON, GEORGIA, ASSIGNOR OF ONE-HALF TO ARTHUR H. WILLIAMSON, OF MACON, GEORGIA.

PIPE-COUPLING.

No. 852,365.      Specification of Letters Patent.      Patented April 30, 1907.

Application filed January 3, 1906. Serial No. 294,414.

*To all whom it may concern:*

Be it known that I, JACOB TAMAS WILLIS, a citizen of the United States, residing at Macon, in the county of Bibb and State of Georgia, have invented certain new and useful Improvements in Pipe-Couplings, of which the following is a specification.

My invention relates to improvements in hose or pipe couplings, particularly for use with what are generally known as angle-cocks of train-pipes.

It has for its object to provide for readily or quickly effecting the coupling operation as well as the uncoupling operation and to carry out the same in a simple, economic and effective manner.

Said invention consists of certain structural features substantially as hereinafter fully disclosed and pointed out by the appended claims.

In the accompanying drawing illustrating the preferred embodiment of my invention—Figure 1 is a broken partly sectional and partly side elevation thereof. Fig. 2 is a full side elevation, and Fig. 3 is a front elevation of the same.

In carrying out my invention, I provide the angle-cock casting or member 1 of the train-pipe, preferably with an internally screw-threaded nozzle or arm $1^a$; and into this nozzle is screwed, or otherwise connected thereto, a tubular coupling-member or section 2, as at $2^x$, while with the contiguous end of the train-pipe or hose is suitably secured the other coupling member or section 3, the two members having seated in the meeting enlarged portions or faces thereof packing rings or abutments 4 for forming a steam or air tight joint at that point.

The coupling member or section 2 has a lateral hook-terminated or ended stud $2^a$ curved or pointed outward and beyond the face of said member; and oppositely to said stud said coupling member has two outstanding spaced-apart lugs $2^b$ between which is pivoted or hung a T-shaped gravity link 5, the purpose of which will be presently apparent.

The coupling-member or section 3 has a lateral eye-equipped stud $3^a$ to receive the hook-ended stud $2^a$ of the coupling-member 2 so as to interlock therewith as shown in effecting the coupling operation. This same coupling member 3 has oppositely to the eye-equipped stud $3^a$, parallel spaced-apart lugs $3^b$ having outward tapered ends or terminals, and which are also flared inward, whereby, it will be noted, that, as the link 5 is inserted therebetween and that as its cross-head is forced into engagement with said lugs, along the inward flared lower surfaces of said lugs, a binding or wedging action will result between said cross-head and said parallel lugs $3^b$, thus effectively coupling the members 2 and 3 together.

It is obvious that the coupling-member 2 could be readily cast integral with the arm $1^a$ of the angle-cock casting 1 without materially changing the aforesaid results.

I claim:

A pipe-coupling comprising two members or pipe-sections, one having an arm-extension beyond its face curving or hooked downward and opposite of this latter a gravity T-shaped link, and the other member or pipe-section provided with an eye-ended lug to receive said hook-ended arm-extension and opposite said lug with a bifurcated or slotted lug having an underneath beveled surface, said T-form of link entering the slot of the latter lug and having its head engaging the beveled surface of said lug.

In testimony whereof I have signed my name to this specification in the presence of two subscribing witnesses.

JACOB TAMAS WILLIS.

Witnesses:
     B. J. FOWLER,
     C. A. GLAWSON.